No. 736,712. Patented August 18, 1903.

UNITED STATES PATENT OFFICE.

RICARDO FORTUN AND EDUARDO SEMPRUN, OF MADRID, SPAIN.

SOLDER FOR ALUMINIUM.

SPECIFICATION forming part of Letters Patent No. 736,712, dated August 18, 1903.

Application filed April 9, 1903. Serial No. 151,853. (No specimens.)

*To all whom it may concern:*

Be it known that we, RICARDO FORTUN Y PELLETIER, residing at Calle de Fernando VI, No. 10, and EDUARDO SEMPRUN Y SEMPRUN, residing at Calle de Valverde, No. 6, Madrid, Spain, have invented an Improvement in Solders for Aluminium, of which the following is a specification.

The object of the present invention is to obtain a solid and perfect solder by which surfaces of aluminium and its alloys may be joined together and soldered in a simple, strong, and firm manner. According to the best information which we have been able to collect this has hitherto been impossible, and from the report of the best authority on the subject, the famous chemist of the College of France, Sainte Cleirre Deville, the difficulties which have been encountered and the very imperfect results obtained have made it necessary to abandon all attempts to solder this metal, thus closing up to the metal industry the infinite forms to which a metal possessing such excellent conditions as aluminium could be applied.

Under the process discovered by us the metal may be manufactured in the ordinary way the same as other metals of ordinary use, and the act of soldering only varies from the ordinary tin-soldering in that the soldering-iron must have a steel bit of the same shape as the copper bit used in ordinary solderings. Further, the surfaces to be soldered do not require more than the usual care—*i. e.*, the most perfect adaptation and cleanliness possible—and in order that absolute cleanliness may be obtained a solder-brush which has previously been soaked in sulfuric ether should be passed over the line of union of the parts it is desired to solder. This done it is only then necessary to run the soldering-iron over in the usual way.

The industrial product which constitutes this solder is manufactured in the following manner: In an earthenware melting-pot, which must be new for each fresh manufacture, is placed some fine vegetable-carbon powder which has been passed through a fine sieve. The melting-pot thus prepared is then heated on a fierce fire for the space of fifteen minutes. The fusion of the following metals therein is then immediately proceeded with one after the other in the order as now given: copper, six grams; silver, one gram; bismuth, three grams; antimony, five decigrams; tin, sixty grams; aluminium, 29.5 grams—total, one hundred grams. When the fusion and union of these metals is complete, the following mixture is sprinkled on the liquid metal at the instant of taking the melting-pot off the fire: powdered sulfur, one gram; metallic arsenic, five decigrams. This last operation should be carried out under a chimney having a good draft, because the vapors which rise from the action of the arsenic are very dangerous, the larger the quantity of arsenic used the greater becoming the danger. Finally the liquid metal is poured into shapes taking the form of bars in order that the solder may be more easily handled, the flame of an ordinary alcohol-lamp being sufficient for the use of same. The solder thus made joins with and adheres with such consistency to the aluminium that two sheets of this metal of twenty centimeters long by one centimeter wide, having a uniform thickness of sixty-three one-hundredths of a millimeter, soldered one to the other for one centimeter of its length, withstood without the least impression a test of forty-seven kilograms.

Having now particularly described and ascertained the nature of this invention and in what manner the same is to be performed, we declare that we claim as our exclusive property—

The industrial product composed of an alloy of determined proportions of copper, silver, bismuth, antimony, tin and aluminium, sulfureted and arsenicated, substantially as described.

In witness whereof we have hereunto set our hands in presence of two witnesses.

RICARDO FORTUN.
EDUARDO SEMPRUN.

Witnesses:
MIGUEL DE LA AJLE À DUARTE,
VICTORIO LORENZO.